(12) United States Patent
Suzuki et al.

(10) Patent No.: US 10,807,565 B2
(45) Date of Patent: Oct. 20, 2020

(54) VEHICLE CONTROL DEVICE

(71) Applicant: HONDA MOTOR CO., LTD., Tokyo (JP)

(72) Inventors: Atsuyuki Suzuki, Wako (JP); Naoko Imai, Wako (JP); Tomoko Shintani, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/439,824

(22) Filed: Jun. 13, 2019

(65) Prior Publication Data
US 2020/0001824 A1  Jan. 2, 2020

(30) Foreign Application Priority Data

Jul. 2, 2018 (JP) ................................. 2018-125849

(51) Int. Cl.
*B60R 25/24* (2013.01)
*G06Q 30/06* (2012.01)

(52) U.S. Cl.
CPC .......... *B60R 25/24* (2013.01); *G06Q 30/0645* (2013.01); *B60R 2325/205* (2013.01)

(58) Field of Classification Search
CPC .... B60R 25/34; B60R 25/24; G06Q 30/0645; H04W 12/06; H04L 9/32
USPC ........................................................ 340/5.28
See application file for complete search history.

(56) References Cited

U.S. PATENT DOCUMENTS

| 10,377,345 B1* | 8/2019 | Oesterling ............ B60R 25/241 |
| 2014/0094987 A1* | 4/2014 | Healey .................... B60R 25/00 701/1 |
| 2017/0104589 A1* | 4/2017 | Lambert ................. H04W 4/40 |

FOREIGN PATENT DOCUMENTS

JP      2006-206225      8/2006

* cited by examiner

*Primary Examiner* — Vernal U Brown
(74) *Attorney, Agent, or Firm* — Rankin, Hill & Clark LLP

(57) ABSTRACT

A scheduled use period recognition unit recognizes a scheduled period for use of a vehicle by a user. An unscheduled use detection unit detects an unscheduled use start operation that is an operation performed by a provider so as to start the use of the vehicle during the scheduled use period. An unscheduled use inhibition unit executes, when the unscheduled use start operation is detected, unscheduled use inhibition processing for inhibiting the use of the vehicle by the provider.

6 Claims, 6 Drawing Sheets

FIG.2

| PROVIDER ID 201a | PROVIDER INFORMATION 201b | VEHICLE INFORMATION 201c | ELECTRONIC KEY USE CONDITION 201d | VEHICLE RENTAL CONDITION 201e | SCHEDULE BOOK 201f | RENTABLE PERIOD 201g | SCHEDULED USE PERIOD, HOUSING CONDITION 201h | USER INFORMATION 201i |
|---|---|---|---|---|---|---|---|---|
| Ps-001 | PsIF-A | CARIF-A | VkC-A | RLC-A | SCHIF-A | Tra-A | UTA-001<br>UTA-002<br>UTA-003<br>UTA-004 | PuIF-001<br>PuIF-002<br>PuIF-003<br>PuIF-004 |
| Pt-002 | PsIF-B | CARIF-B | VkC-B | RLC-B | SCHIF-B | Tra-B | UTB-001<br>UTB-002<br>UTB-003 | PuIF-005<br>PuIF-006<br>PuIF-007 |
| Pt-003 | PsIF-C | CARIF-C | VkC-C | RLC-C | SCHIF-C | Tra-C | UTC-001<br>UTC-002<br>UTC-003 | PuIF-008<br>PuIF-009<br>PuIF-010 |
| Pt-004 | PsIF-D | CARIF-D | VkC-D | RLC-D | SCHIF-D | Tra-D | UTD-001<br>UTD-002<br>UTD-003 | PuIF-011<br>PuIF-012<br>PuIF-013 |
| Pt-005 | PsIF-E | CARIF-E | VkC-E | RLC-E | SCHIF-E | Tra-E | UTE-001<br>UTE-002<br>UTE-003 | PuIF-014<br>PuIF-015<br>PuIF-016 |
| .. | .. | .. | .. | .. | .. | .. | .. | .. |

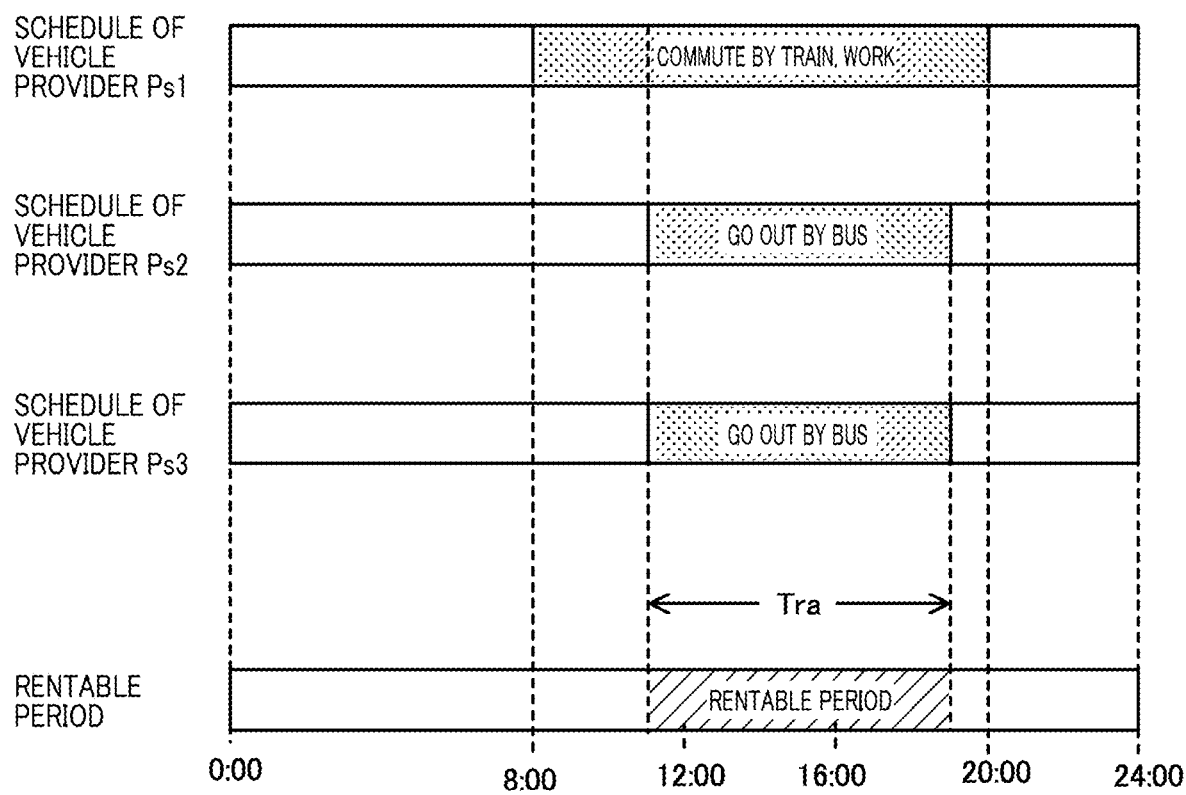

VEHICLE CONTROL DEVICE

INCORPORATION BY REFERENCE

The present application claims priority under 35 U.S.C. § 119 to Japanese Patent Application No. 2018-125849 filed on Jul. 2, 2018. The content of the application is incorporated herein by reference in its entirety.

BACKGROUND OF THE INVENTION

Field of the Invention

The present invention relates to a vehicle control device.

Description of the Related Art

Conventionally, there has been proposed a system in which in response to a request from a communication terminal held by a home delivery dealer, a housing part of a vehicle that is parked at a receiver's home or the like is unlocked and locked so as to house a delivery article in the housing part of the vehicle when the receiver is absent, thereby allowing the delivery to be completed (for example, see Japanese Patent Laid-Open No. 2006-206225).

SUMMARY OF THE INVENTION

As a mode of utilizing a housing part of a vehicle that is not in use, such as a system described in Japanese Patent Laid-Open No. 2006-206225, it can be considered that the housing part of the vehicle is rented out as a temporary deposit space of an article like a rental locker. If an owner of the vehicle carelessly uses the vehicle to move the vehicle to another place while the housing part of the vehicle is being rented out, a user who has deposited goods in the housing part becomes unable to receive the goods.

The present invention has been made in view of the background described above, and it is an object of the present invention to provide a vehicle control device capable of preventing a user from using a vehicle while another user is using the vehicle in a case where a plurality of users use the vehicle during different use periods.

A vehicle control device of an aspect of the present invention is a vehicle control device that supports shared use of a vehicle among a plurality of users. The vehicle control device includes: a scheduled use period recognition unit that recognizes a scheduled period for use of the vehicle by a first user, the first user being any one of the plurality of users; an unscheduled use detection unit that detects an unscheduled use start operation performed by a second user so as to start the use of the vehicle during the scheduled period for use of the vehicle by the first user, the second user being any one of the plurality of users except the first user, the scheduled period for use of the vehicle by the first user being recognized by the scheduled use period recognition unit; and an unscheduled use inhibition unit that executes unscheduled use inhibition processing for inhibiting the use of the vehicle by the second user when the unscheduled use start operation is detected by the unscheduled use detection unit.

In addition, the unscheduled use detection unit may detect an unlock operation for the vehicle as an operation for starting the use of the vehicle; and the unscheduled use inhibition unit may execute first reporting or execute processing for inhibiting the unlocking of the vehicle, as the unscheduled use inhibition processing.

In addition, the unscheduled use detection unit may detect a start operation for the vehicle as an operation for starting the use of the vehicle; and the unscheduled use inhibition unit may execute second reporting or execute processing for inhibiting the starting of the vehicle, as the unscheduled use inhibition processing.

In addition, the use of the vehicle by the first user may indicate use as a deposit space for housing an article in a housing part of the vehicle parked in a predetermined place. The unscheduled use inhibition unit may execute processing for inhibiting the driving of the vehicle as the unscheduled use inhibition processing when the unscheduled use start operation is detected by the unscheduled use detection unit in a state where the remaining time of the scheduled period for use of the vehicle by the first user is a predetermined time or less, the scheduled period for use of the vehicle by the first user being recognized by the scheduled use period recognition unit.

In addition, the vehicle control device may further include an electronic key use recognition unit, the electronic key use recognition unit recognizing that an electronic key for operating the vehicle has been used. The unscheduled use detection unit may determine, when an operation for starting the use of the vehicle is performed in a state where the use of the electronic key is recognized by the electronic key use recognition unit, whether the operation is performed by the second user, through checking a user associated with the electronic key.

Advantageous Effect of Invention

In the vehicle control device of an aspect of the present invention, an unscheduled use start operation performed by the second user during the scheduled period for use of the vehicle by the first user is detected by the unscheduled use detection unit. Further, when the unscheduled use start operation is detected, the unscheduled use inhibition unit executes unscheduled use inhibition processing for inhibiting the use of the vehicle by the second user. This prevents the second user from using the vehicle during the scheduled period for use of the vehicle by the first user.

BRIEF DESCRIPTION OF THE DRAWINGS

FIG. 2 shows an illustration of a rental registration table;

FIG. 3 shows an illustration of an example of setting a rentable period;

DETAILED DESCRIPTION OF THE PREFERRED EMBODIMENTS

1. Vehicle Housing Part Rental Service

Figure 1:
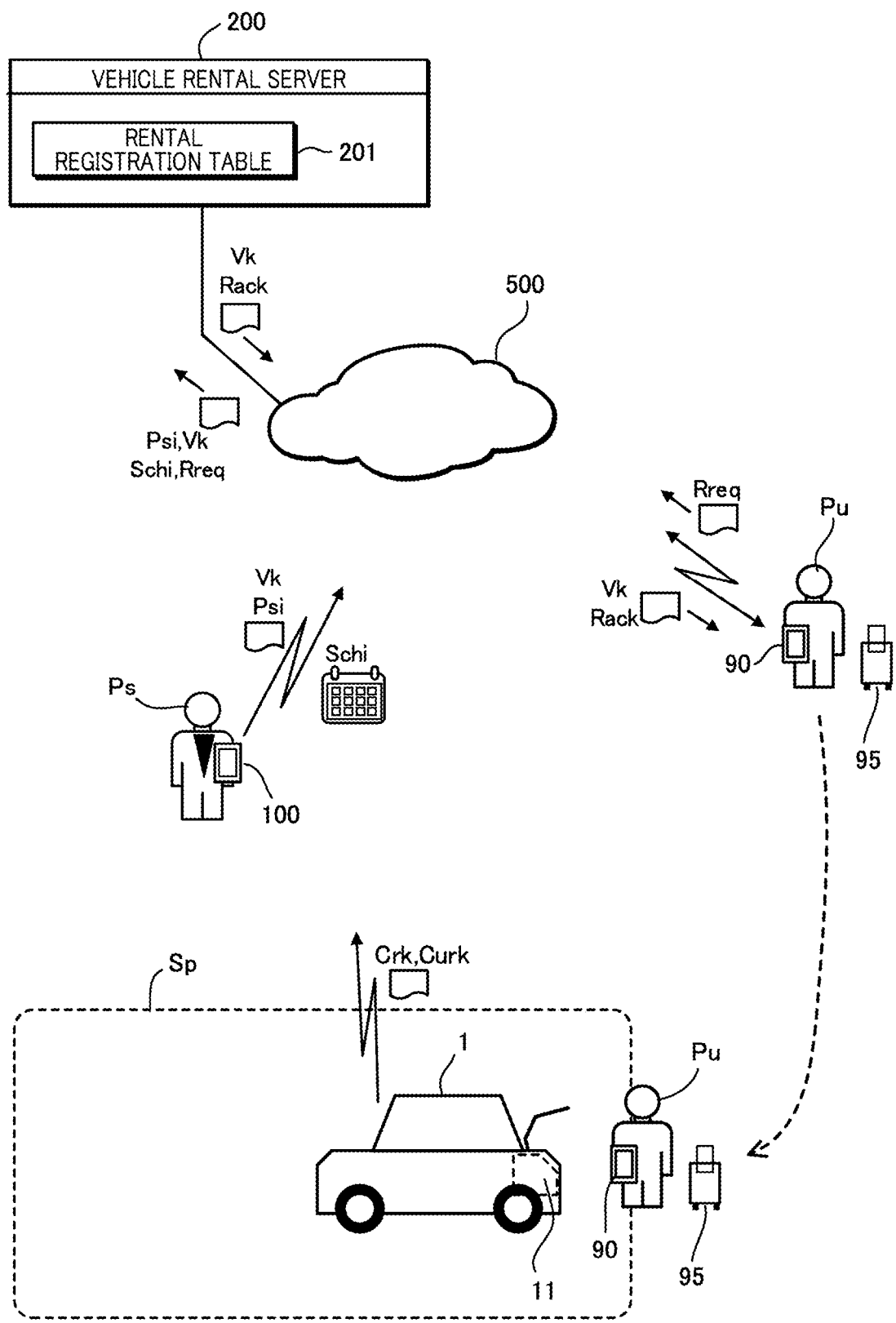
FIG. 1 shows an illustration of a service of renting out a housing part of a vehicle as a deposit space for goods.

FIG. 1 is an illustration of a vehicle shared-use mode in this embodiment. In this mode, a provider Ps who is an owner of a vehicle 1 rents out a trunk 11 of the vehicle 1

(housing part of the vehicle 1) as a deposit space of goods to a user Pu. The provider Ps corresponds to a first user of the present invention and the user Pu corresponds to a second user in the present invention. Alternatively, an occupant compartment of the vehicle 1 may be rented out as a deposit space of goods.

A trunk rental service is operated by a vehicle rental server 200. The vehicle rental server 200 communicates via a communication network 500 with a communication terminal 100 used by the provider Ps (hereinafter, described as a provider communication terminal 100), the vehicle 1, and a communication terminal 90 used by the user Pu who uses the rental service (hereinafter, described as a user communication terminal 90).

In addition, the vehicle 1 performs a direct communication with the user communication terminal 90 to receive an instruction for unlocking and locking the trunk 11 of the vehicle 1 using an electronic key (virtual key) Vk. As the user communication terminal 90 and provider communication terminal 100, a smart phone, cell phone, tablet terminal, etc. are used.

The user Pu accesses the vehicle rental server 200 by using the user communication terminal 90, checks a predetermined place (parking place) where the vehicle 1 is parked, and reserves the use of the trunk 11 of the vehicle 1 with a scheduled use period and housing condition (such as setting of a housing temperature by the operation of an air conditioning apparatus provided for the vehicle 1) specified. Then, the user Pu takes goods (article) 95 to a parking place Sp of the vehicle 1, unlocks and locks the trunk 11 by using an electronic key Vk that has been transmitted from the vehicle rental server 200 to the user communication terminal 90, and houses the goods 95 in the trunk 11. After that, the user Pu returns to the parking place Sp of the vehicle 1 before the reserved scheduled use period passes, unlocks and locks the trunk 11 by using the electronic key Vk, and receives the goods 95.

The vehicle rental server 200 stores, for example, a rental registration table 201 in which information on each of vehicle providers who have performed use registration in order to rent out their owned vehicle as a deposit space, information on deposit spaces, etc. are recorded. The vehicle rental server 200 receives both provider information Psi (including the profile of a provider Ps, information on a provided vehicle 1, etc.) and schedule book information Schi showing the action plan of the provider Ps which are transmitted from the provider communication terminal 100; issues a provider ID (identification) that is identification information of the provider Ps; and records them in the rental registration table 201. In addition, the vehicle rental server 200 receives from the provider communication terminal 100 an electronic key Vk for unlocking and locking the trunk 11 of the vehicle 1, and records it in the rental registration table 201.

As shown in FIG. 2, in the rental registration table 201, there are recorded in association with a provider ID 201a of each of the providers who have performed a deposit space rental registration: provider information 201b (the profile of a provider, the communication address of a provider communication terminal used by the provider, etc.); vehicle information 201c (the parking position, model, registration number, color, electronic key, etc. of a provided vehicle); an electronic key use condition 201d (restrictions on a door unlockable by an electronic key, etc.); a rental condition 201e (the allowable size of goods for housing, type of an on-vehicle apparatus such as an air conditioning apparatus, etc.); a schedule book 201f; a rentable period 201g; a scheduled use period/housing condition 201h; and user information 201i (the communication address of a communication terminal used by a user, etc.).

A scheduled use period is associated with information on a user who has reserved the scheduled used period. For example, in FIG. 2, as for a provider whose provider ID is Ps-001, a scheduled use period UTA-001 is recorded in association with user information PuIF-001.

The provider communication terminal 100 transmits the schedule book information Schi of the provider Ps, which is managed by a schedule management application used in the provider communication terminal 100, to the vehicle rental server 200. The schedule management application transmits, when addition, correction, or change has been made in the schedule of the provider Ps which is registered in the schedule book, updated schedule book information Schi to the vehicle rental server 200. Then, the vehicle rental server 200 receives the updated schedule book information Schi and updates the schedule book 201f of the rental registration table 201. Alternatively, not through the schedule management application, the provider Ps may access the vehicle rental server 200 by using the provider communication terminal 100 and directly input his/her own schedule.

Here, FIG. 3 shows an example of setting a rentable period of a vehicle. FIG. 3 shows a case in which three vehicle providers Ps1, Ps2, and Ps3 daily use one vehicle. The vehicle providers Ps1, Ps2, and Ps3 are, for example, family members who live in the same house. In the schedule book of the vehicle provider Ps1, the action schedule of commuting by train and working, from 8:00 AM to 8:00 PM, is registered. In addition, in both the schedule books of the vehicle providers Ps2 and Ps3, the action schedule of going out by bus, from 11:00 AM to 7:00 PM, is registered.

Accordingly, the vehicle rental server 200 recognizes, as a rentable period Tra, a period from 11:00 AM to 7:00 PM in which all the vehicle providers Ps1, Ps2, and Ps3 go out without using the vehicle and thus the vehicle is not used; and records it in the rental registration table 201.

2. Configuration of a Vehicle

Next, with reference to FIG. 4, the configuration of the vehicle 1 will be described. The vehicle 1 includes: a vehicle control device 10 for controlling the operation of the vehicle 1; and an air conditioning apparatus 12, door lock mechanism 50, door lock sensor 51, ignition switch 52, indicator 53, speaker 54, light 55, navigation unit 60, and communication unit 70 which are communicably connected with the vehicle control device 10 via CAN (Controller Area Network) 5.

The air conditioning apparatus 12 performs air conditioning for cooling, heating, and dehumidification of a vehicle compartment of the vehicle 1 including the trunk 11. The door lock mechanism 50 locks and unlocks a door (trunk, door) of the vehicle 1. The door lock sensor 51 detects the locked and unlocked states of the door. The ignition switch 52 receives the start and stop operations of the vehicle 1. The indicator 53 and speaker 54, which are arranged on a dashboard, etc. of the vehicle 1, provide a report to passengers. The light 55 includes a head light and a hazard light, etc.

The navigation unit 60 includes: a GPS receiver 61 that receives a signal transmitted from a GPS (Global Positioning System) satellite and detects the current position (latitude, longitude) of the vehicle 1; and map data 62 that is stored in a memory (not illustrated). The navigation unit 60 performs route guide to a destination on the basis of both the current position of the vehicle 1 which is detected by the GPS receiver 61 and the map data 62.

The communication unit 70 includes a short-range wireless communication unit 71 and TCU (Telematics Communication unit) 72. The short-distance wireless communication unit 71 performs a short-range wireless communication with the user communication terminal 90 and provider communication terminal 100 in compliance with a communication standard such as BR/EDR (Bluetooth Basic Rate/Enhanced Data Rate, Bluetooth is a registered trademark), BLE (Bluetooth Low Energy), NFC, or Wi-Fi (registered trademark). The TCU 72 performs communication with the vehicle rental server 200 via the communication network 500.

The vehicle control device 10 is an ECU (Electronic Control Unit) consisting of a CPU 20, memory 40, etc. The CPU 20 executes a control program 41 for the vehicle 1, which is stored in the memory 40, thereby functioning as a scheduled use period recognition unit 21, electronic key use recognition unit 22, unscheduled use detection unit 23, and unscheduled use inhibition unit 24 so as to support shared use of the vehicle 1 among a plurality of users.

The memory 40 stores the control program 41 and also stores vehicle ID information 42 and electronic key information 43. The vehicle ID information 42 includes: a vehicle ID (IdP address, etc.) for network communication, which is used in communicating with the vehicle rental server 200 by the TCU 72 of the communication unit 70; and a vehicle ID (BR/EDR, BLE, authentication code of NFC, MAC (Media Access Control) address for Wi-Fi connection, etc.) for a short-range wireless communication which is used in communicating with the user communication terminal 90 and provider communication terminal 100 by the short-range wireless communication unit 71. In the electronic key information 43, information on the electronic key Vk which is transmitted to the vehicle rental server 200 according to user information Pui and recorded in the rental registration table 201 is recorded.

The scheduled use period recognition unit 21 refers to the scheduled period for use of the trunk 11 of the vehicle 1 which is recorded in the rental registration table 201 of the vehicle rental server 200, and recognizes the scheduled period for use of the trunk 11 by the user Pu. The electronic key use recognition unit 22 recognizes that the user Pu has unlocked and locked the trunk 11, by referring to the user information that is recorded in association with the electronic key Vk in the rental registration table 201.

The unscheduled use detection unit 23 detects an unscheduled use start operation that is an operation performed by the provider Ps so as to start the use of the vehicle 1 during the scheduled period for use of the trunk 11 by the user Pu. In this embodiment, the unlock operation for the vehicle 1 and the start operation for the vehicle 1 are detected as an unscheduled use start operation.

The unscheduled use inhibition unit 24 executes, when the unscheduled use start operation is detected by the unscheduled use detection unit 23, unscheduled use inhibition processing for inhibiting the use of the vehicle 1 by the provider Ps. As described later, the unscheduled use inhibition unit 24 reports that the trunk 11 is being rented out and executes processing for inhibiting the unlocking and starting of the vehicle 1, as processing for inhibiting the use of the vehicle 1 by the provider Ps.

3. Processing for Depositing and Receiving Goods

Figure 5:
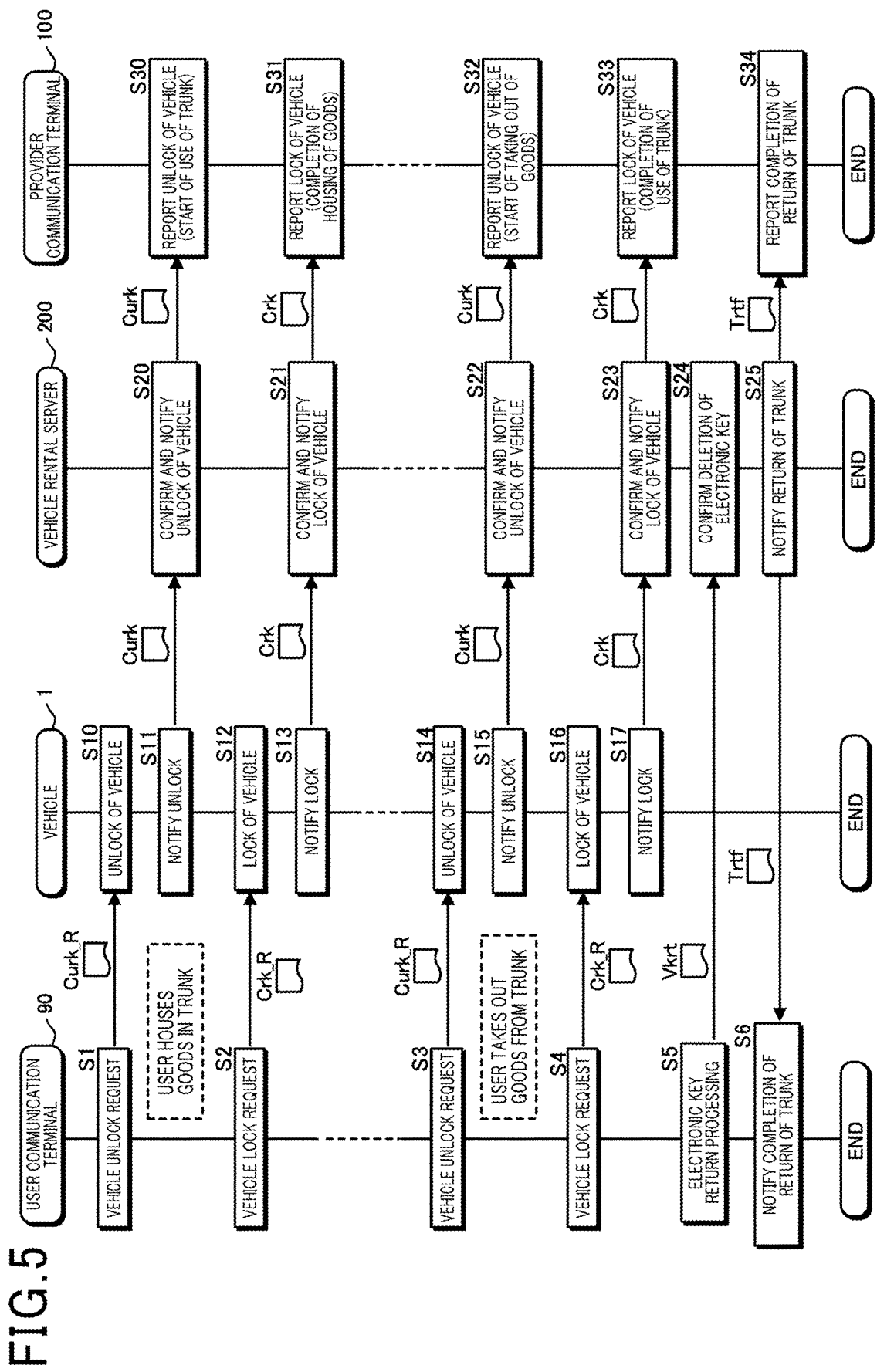
FIG. 5 shows a flowchart of processing by a user communication terminal, vehicle, vehicle rental server 200, and provider communication terminal in a vehicle housing part rental service.

Next, described according to a flowchart shown in FIG. 5 is processing executed by the user communication terminal 90, vehicle 1, vehicle rental server 200, and provider communication terminal 100 when the user Pu who has reserved the use of the trunk 11 of the vehicle 1 houses goods 95 in the trunk 11 and when the user takes out the goods 95 from the trunk 11 as shown in FIG. 1.

At step S1, the user communication terminal 90 transmits vehicle unlock request information Curk_R for requesting to unlock the trunk 11, to the vehicle 1 in response to an unlock operation by the user Pu. At step S10, the vehicle control device 10 of the vehicle 1 operates, when receiving the vehicle unlock request information Curk_R, the door lock mechanism 50 to unlock the trunk 11. Then, at a subsequent step S11, the vehicle control device 10 transmits vehicle unlock information Curk for notifying that the trunk 11 has been unlocked, to the vehicle rental server 200.

At step S20, the vehicle rental server 200 recognizes, by the reception of the vehicle unlock information Curk, that the trunk 11 has been unlocked, and transmits the vehicle unlock information Curk to the provider communication terminal 100. At step S30, the provider communication terminal 100 reports, when receiving the vehicle unlock information Curk, that the trunk 11 has been unlocked and the use of the trunk 11 has been started, by display on a display unit (not illustrated), output of voice guidance from a speaker (not illustrated), or the like. By checking this report, the provider Ps can recognize that the use of the trunk 11 by the user Pu has been started.

At step S2, the user communication terminal 90 transmits, when the lock operation for the trunk 11 is performed by the user Pu who has housed goods in the trunk 11, vehicle lock request information Crk_R for requesting to lock the trunk 11, to the vehicle 1. At step S12, the vehicle control device 10 of the vehicle 1 operates, when receiving the vehicle lock request information Crk_R, the door lock mechanism 50 to lock the trunk 11. At a subsequent step S13, the vehicle control device 10 confirms that the locking of the trunk 11 has been detected by the door lock sensor 51, and transmits vehicle lock information Crk for notifying that the trunk 11 has been locked, to the vehicle rental server 200.

At step S21, the vehicle rental server 200 recognizes, by the reception of the vehicle lock information Crk, that the trunk 11 has been locked, and transmits the vehicle lock information Crk to the provider communication terminal 100. At step S31, the provider communication terminal 100 reports, when receiving the vehicle lock information Crk, that the trunk 11 has been locked and the housing of the goods 95 into the trunk 11 has been completed, by display on the display unit, output of voice guidance from the speaker, or the like. By checking this report, the provider Ps can recognize that the housing of the goods 95 into the trunk 11 by the user Pu has been completed.

Next, in response to an unlock operation for the trunk 11 by the user Pu who has returned to the parking place Sp of the vehicle 1 in order to receive the goods 95, the user communication terminal 90 transmits, at step S3, the vehicle unlock request information Curk_R for requesting to unlock the trunk 11, to the vehicle 1. At step S14, the vehicle control device 10 of the vehicle 1 operates, when receiving the vehicle unlock request information Curk_R, the door lock mechanism 50 to unlock the trunk 11. Then, at a subsequent step S15, the vehicle control device 10 transmits the vehicle unlock information Curk for notifying that the trunk 11 has been unlocked, to the vehicle rental server 200.

At step S22, the vehicle rental server 200 recognizes, by the reception of the vehicle unlock information Curk, that the trunk 11 has been unlocked, and transmits the vehicle unlock information Curk to the provider communication terminal 100. At step S32, the provider communication terminal 100 reports, when receiving the vehicle unlock information Curk, that the trunk 11 has been unlocked and the taking of the goods 95 out of the trunk 11 has been started, by display on the display unit, output of voice guidance from the speaker, or the like. By checking this report, the provider Ps can recognize that the taking of the goods 95 out of the trunk 11 by the user Pu has been started.

At step S4, the user communication terminal 90 transmits, when the lock operation for the trunk 11 is performed by the user Pu who has taken the goods 95 out of the trunk 11, the vehicle lock request information Crk_R for requesting to lock the trunk 11, to the vehicle 1. At step S16, the vehicle control device 10 of the vehicle 1 operates, when receiving the vehicle lock request information Crk_R, the door lock mechanism 50 to lock the trunk 11. At a subsequent step S17, the vehicle control device 10 confirms that the locking of the trunk 11 has been detected by the door lock sensor 51, and transmits the vehicle lock information Crk for notifying that the trunk 11 has been locked, to the vehicle rental server 200.

At step S23, the vehicle rental server 200 recognizes, by the reception of the vehicle lock information Crk, that the trunk 11 has been locked, and transmits the vehicle lock information Crk to the provider communication terminal 100. At step S33, the provider communication terminal 100 reports, when receiving the vehicle lock information Crk, that the trunk 11 has been locked, the goods 95 has been taken out of the trunk 11, and the use of the trunk 11 has been completed, by display on the display unit, output of voice guidance from the speaker, or the like. By checking this report, the provider Ps can recognize that the use of the trunk 11 by the user Pu has been completed.

At step S5, the user communication terminal 90 deletes the electronic key Vk stored in the memory of the user communication terminal 90 in response to the return operation for the electronic key Vk by the user Pu, and transmits electronic key return information Vkrt for notifying that the electronic key Vk has been deleted, to the vehicle rental server 200. The vehicle rental server 200 recognizes, by the reception of the electronic key return information Vkrt, that the electronic key Vk has been deleted from the user communication terminal 90, and transmits trunk return information Trtf for notifying that the return of the trunk 11 has been completed, to the user communication terminal 90 and provider communication terminal 100.

At step S34, the provider communication terminal 100 reports, when recognizing the completion of return of the trunk 11 by the reception of the trunk return information Trtf, that the return of the trunk 11 has been completed, by display on the display unit, output of voice guidance from the speaker, or the like. By checking this report, the provider Ps can recognize that the return of the trunk 11 has been completed.

At step S6, the user communication terminal 90 reports, when recognizing the completion of return of the trunk 11 by the reception of the trunk return information Trtf, that the return of the trunk 11 has been completed, by display on the display unit, output of voice guidance from the speaker, or the like. By recognizing this report, the user Pu can recognize that the trunk 11 has been returned.

4. Processing for Inhibiting an Erroneous Use During a Rental Period

Figure 6:
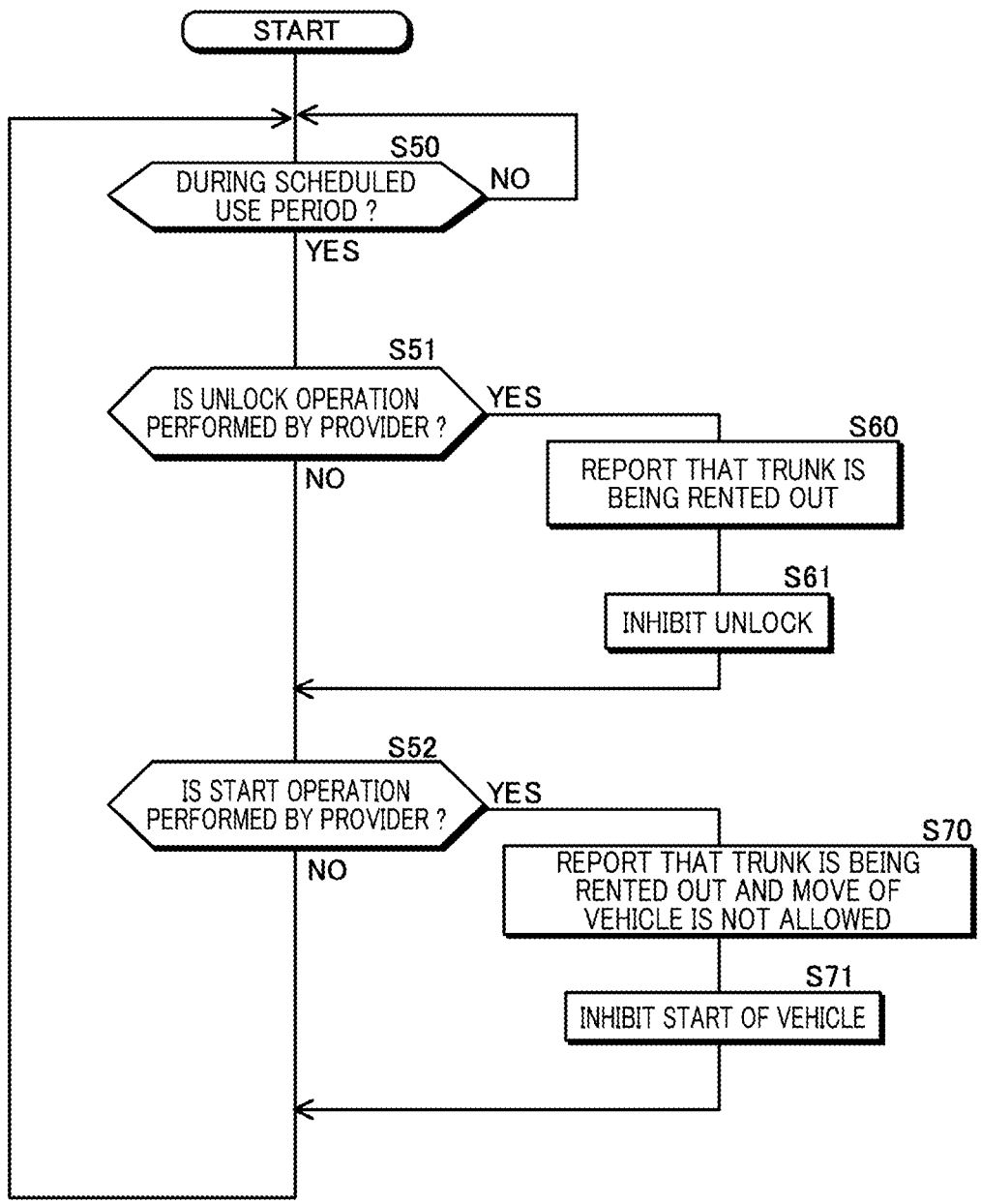
FIG. 6 shows a flowchart of processing for inhibiting the use of a vehicle by a provider during a scheduled period for use by a user.

Next, described according to a flowchart shown in FIG. 6 is processing for inhibiting the provider Ps from erroneously using the vehicle 1 during the scheduled period for use of the trunk 11 of the vehicle 1 by the user Pu. The flowchart shown in FIG. 6 is executed by the unscheduled use detection unit 23 and unscheduled use inhibition unit 24.

At step S50, the unscheduled use detection unit 23 determines, by the scheduled use period recognition unit 21, whether the current time is in the scheduled use period which has been reserved by the user Pu. If the current time is in the scheduled use period, the scheduled use period recognition unit 21 proceeds with the processing to step S51.

At step S51, the unscheduled use detection unit 23 determines whether the provider Ps has performed the unlock operation for the trunk 11 of the vehicle 1. Here, the unscheduled use detection unit 23 detects, when the unlock operation for the trunk 11 is performed by a remote control key held by the provider Ps or when it is recognized by the electronic key use recognition unit 22 that the unlock operation for the trunk 11 has been performed by an electronic key authenticated by the ID of the provider Ps, that the unlock operation for the trunk 11 has been performed by the provider Ps.

Then, the unscheduled use detection unit 23 proceeds with the processing to step S60 if detecting that the provider Ps has performed the unlock operation for the trunk 11 of the vehicle 1; or proceeds with the processing to step S52 if not detecting the unlock operation for the trunk 11 by the provider Ps.

Steps S60 and S61 are processing by the unscheduled use inhibition unit 24. At step S60, the unscheduled use inhibition unit 24 reports that the trunk 11 is being rented out, by output of voice guidance from the speaker 54, flashing of the light 55, etc. In addition, at a subsequent step S61, the unscheduled use inhibition unit inhibits the unlocking of the trunk 11.

The report at step S60 corresponds to the first report of the present invention. The report at step S60 allows the provider Ps to recognize that the trunk 11 is being rented out. In addition, inhibiting the unlocking of the trunk 11 by the processing at step S61 prevents the provider Ps from erroneously using the vehicle 1 during the scheduled period for use of the trunk 11 by the user Pu.

At step S52, the unscheduled use detection unit 23 determines whether the provider Ps has performed the start operation for the vehicle 1. Here, the unscheduled use detection unit 23 detects, when the start operation for the vehicle 1 is performed by the remote control key held by the provider Ps or when the start operation for the vehicle 1 is performed by the electronic key authenticated by the ID of the provider Ps, that the start operation for the vehicle 1 is performed by the provider Ps.

Then, the unscheduled use detection unit 23 proceeds with the processing to step S70 if detecting the start operation for the vehicle 1 by the provider Ps; or proceeds with the processing to step S50 if not detecting the start operation for the vehicle 1 by the provider Ps.

Steps S70 and S71 are processing by the unscheduled use inhibition unit 24. At step S70, the unscheduled use inhibition unit 24 reports that the trunk 11 is being rented out and the move of the vehicle 1 is not allowed, by output of voice guidance from the speaker 54, flashing of the light 55, etc. In addition, at a subsequent step S71, the unscheduled use inhibition unit 24 inhibits the starting of the vehicle 1.

The report at step S70 corresponds to the second report of the present invention. The report at step S70 allows the provider Ps to recognize that the trunk 11 is being rented out. In addition, inhibiting the starting of the vehicle 1 by the processing at step S71 prevents a situation from occurring in which the provider Ps erroneously moves the vehicle 1 during the scheduled period for use of the trunk 11 by the user Pu and the user Pu becomes unable to receive the goods 95.

5. Other Embodiments

In the embodiment described above, the provider Ps and user Pu share the use of the vehicle 1 during different use periods in a mode of renting out the trunk 11 of the vehicle 1 as a deposit space of goods. The present invention is applicable also to a mode of renting out a vehicle itself not as a deposit space and a mode of a plurality of user's using a vehicle by car sharing, as other modes for shared use of a vehicle. In this case, a user who is using a vehicle in a scheduled use period or is preparing for the use of it is the first user of the present invention, and another user except the first user who shares the use of the vehicle is the second user of the present invention.

In the embodiment described above, the unscheduled use inhibition unit 24 performs, as unscheduled use inhibition processing, steps S60, S65, S70, and S71 in FIG. 6 for: reporting that the trunk is being rented out; inhibiting the unlocking of the trunk; reporting that the trunk is being rented out and the move of the vehicle is not allowed; and inhibiting the starting of the vehicle. In another configuration, only part of the above-described unscheduled use inhibition processing may be performed In addition, if a display unit or speaker is provided on a remote control key of a vehicle 1 used by the provider Ps, reporting for inhibiting the provider Ps from using the vehicle 1 may be performed by display on the display unit of the remote control key, a voice output from the speaker on the remote control key, or the like.

In the scheduled period for use of the trunk 11, when the remaining time before the end of the scheduled use period becomes short, the user Pu is more likely to come to pick up goods 95. Then, as unscheduled use inhibition processing by the unscheduled use inhibition unit 24, processing for inhibiting the driving of the vehicle 1 may be performed when the remaining time before the end of the scheduled use period is within a predetermined time (for example, two hours). This configuration prevents a situation from occurring in which, when the user Pu comes to pick up the goods 95, the vehicle 1 has been moved and the user fails to receive the goods 95.

Figure 4:
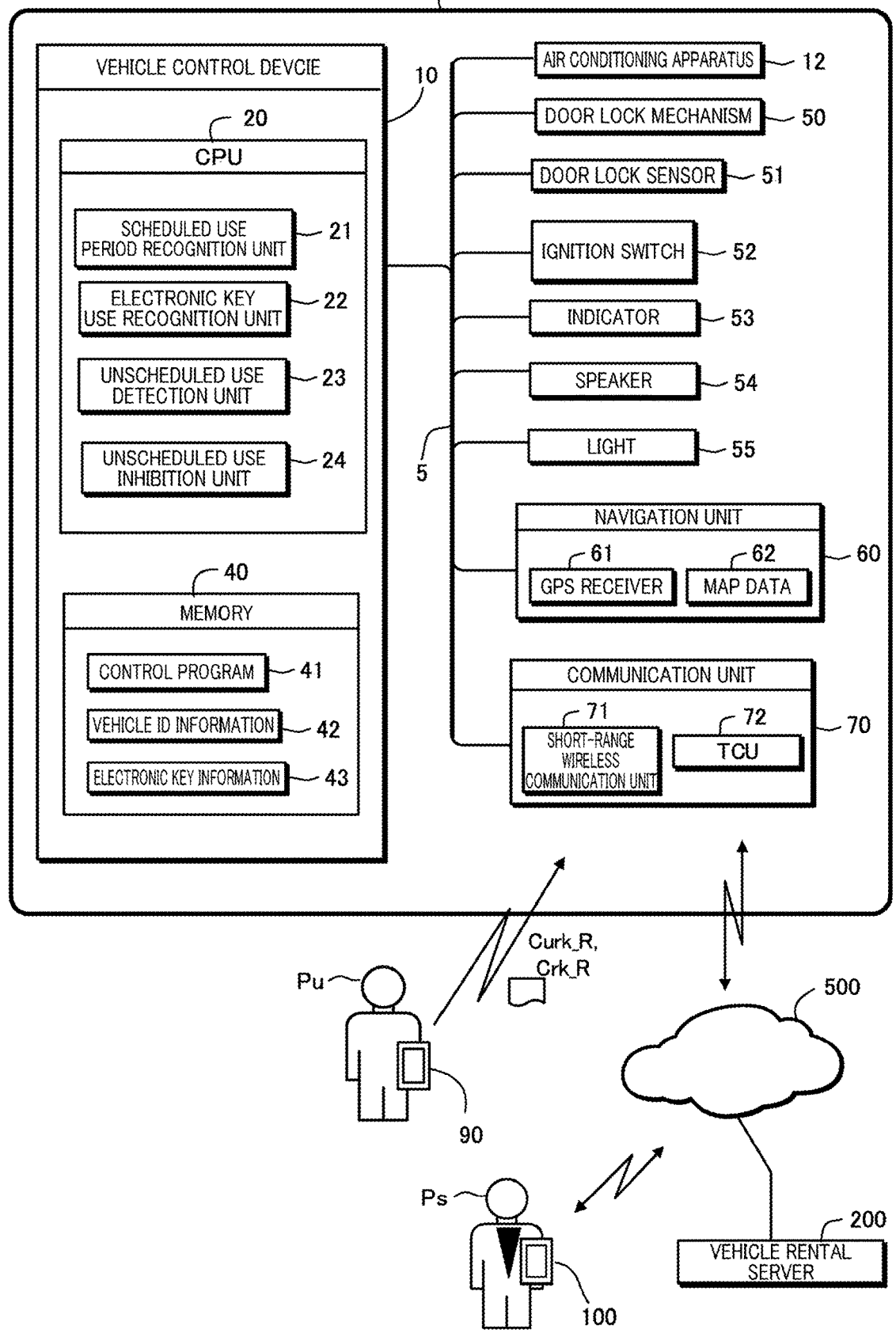
FIG. 4 shows a block diagram of a vehicle with a vehicle control device mounted thereon.

It is noted that although FIG. 4 is a schematic diagram illustrating a functional configuration of the vehicle control device 10 while dividing it by major processing contents for easy understanding of the present invention, the configuration of the vehicle control device 10 may be a configuration by another division. In addition, processing for each component may be either executed by one hardware unit or executed by a plurality of hardware units. Further, processing for each component indicated in FIG. 5 and FIG. 6 may be either executed by one program or executed by a plurality of programs.

REFERENCE SIGNS LIST

1 . . . vehicle, 5 . . . CAN, 10 . . . vehicle control device, 20 . . . CPU, 21 . . . scheduled use period recognition unit, 22 . . . electronic key use recognition unit, 23 . . . unscheduled use detection unit, 24 . . . unscheduled use inhibition unit, 40 . . . memory, 41 . . . control program, 42 . . . vehicle ID information, 43 . . . electronic key information, 50 . . . door lock mechanism, 51 . . . door lock sensor, 52 . . . ignition switch, 53 . . . indicator, 54 . . . speaker, 55 . . . light, 60 . . . navigation unit, 70 . . . communication unit, 90 . . . user communication terminal, 100 . . . provider communication terminal, 200 . . . vehicle rental server, 500 . . . communication network, Pu . . . user (first user), Ps . . . provider (second user).

What is claimed is:

1. A vehicle control device supporting shared use of a vehicle between at least one vehicle provider who provides a vehicle, and at least one user who uses the vehicle provided by the vehicle provider, comprising:
   a CPU and a memory,
   the CPU comprising:
   a rentable period recognizing unit that recognizes a rentable period during which the vehicle is rentable, and records the rentable period to a rental registration table that is stored in the memory;
   a scheduled use period recognition unit that records a scheduled period for use during which the vehicle is reserved to be used by the user to the rental registration table, the scheduled period for use being within the rentable period that is recorded in the rental registration table, and the scheduled use period recognition unit recognizes a scheduled period for use of the vehicle by the user;
   an unscheduled use detection unit that detects an unscheduled use start operation performed by the vehicle provider so as to start the use of the vehicle during the scheduled period for use of the vehicle by the user; and
   an unscheduled use inhibition unit that executes unscheduled use inhibition processing for inhibiting the use of the vehicle by the vehicle provider when the unscheduled use start operation is detected by the unscheduled use detection unit.

2. The vehicle control device according to claim 1, wherein
   the unscheduled use detection unit detects an unlock operation for the vehicle as an operation for starting the use of the vehicle; and
   the unscheduled use inhibition unit executes first reporting or executes processing for inhibiting the unlocking of the vehicle, as the unscheduled use inhibition processing.

3. The vehicle control device according to claim 1, wherein
   the unscheduled use detection unit detects a start operation for the vehicle as an operation for starting the use of the vehicle; and
   the unscheduled use inhibition unit executes second reporting or executes processing for inhibiting the starting of the vehicle, as the unscheduled use inhibition processing.

4. The vehicle control device according to claim 1, wherein
   the use of the vehicle by the user indicates use as a deposit space for housing an article in a housing part of the vehicle parked in a predetermined place; and
   the unscheduled use inhibition unit executes processing for inhibiting the driving of the vehicle as the unscheduled use inhibition processing when the unscheduled use start operation is detected by the unscheduled use detection unit in a state where the remaining time of the scheduled period for use of the vehicle by the user is a predetermined time or less, the scheduled period for use of the vehicle by the first user being recognized by the scheduled use period recognition unit.

5. The vehicle control device according to claim 1, further comprising:

an electronic key use recognition unit, the electronic key use recognition unit recognizing that an electronic key for operating the vehicle has been used, wherein the unscheduled use detection unit determines, when an operation for starting the use of the vehicle is performed in a state where the use of the electronic key is recognized by the electronic key use recognition unit, whether the operation is performed by the vehicle provider, through checking a user associated with the electronic key.

6. A vehicle control device supporting shared use of a vehicle among a plurality of users, comprising a CPU that includes:

a scheduled use period recognition unit that recognizes a scheduled period for use of the vehicle by a first user, the first user being any one of the plurality of users;

an unscheduled use detection unit that detects an unscheduled use start operation performed by a second user so as to start the use of the vehicle during the scheduled period for use of the vehicle by the first user, the second user being any one of the plurality of users except the first user, the scheduled period for use of the vehicle by the first user being recognized by the scheduled use period recognition unit; and an unscheduled use inhibition unit that executes unscheduled use inhibition processing for inhibiting the use of the vehicle by the second user when the unscheduled use start operation is detected by the unscheduled use detection unit, wherein the use of the vehicle by the first user indicates use as a deposit space for housing an article in a housing part of the vehicle parked in a predetermined place; and the unscheduled use inhibition unit executes processing for inhibiting the driving of the vehicle as the unscheduled use inhibition processing when the unscheduled use start operation is detected by the unscheduled use detection unit in a state where the remaining time of the scheduled period for use of the vehicle by the first user is a predetermined time or less, the scheduled period for use of the vehicle by the first user being recognized by the scheduled use period recognition unit.

* * * * *